(12) United States Patent
Hada et al.

(10) Patent No.: US 8,894,795 B2
(45) Date of Patent: Nov. 25, 2014

(54) METHOD AND SYSTEM FOR MANUFACTURING LIQUID CRYSTAL DISPLAY DEVICE

(75) Inventors: Kazuya Hada, Ibaraki (JP); Satoshi Hirata, Ibaraki (JP); Seiji Kondo, Ibaraki (JP); Seiji Umemoto, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 6 days.

(21) Appl. No.: 13/462,103

(22) Filed: May 2, 2012

(65) Prior Publication Data
US 2012/0291945 A1    Nov. 22, 2012

(30) Foreign Application Priority Data

May 20, 2011  (JP) ................................. 2011-113729
Mar. 19, 2012 (JP) ................................. 2012-062116

(51) Int. Cl.
| B29C 65/00 | (2006.01) |
| B32B 37/02 | (2006.01) |
| B32B 37/26 | (2006.01) |
| B32B 38/10 | (2006.01) |
| B32B 37/00 | (2006.01) |
| G02F 1/13  | (2006.01) |
| B32B 37/18 | (2006.01) |
| G02F 1/1335 | (2006.01) |

(52) U.S. Cl.
CPC ....... B32B 37/0015 (2013.01); *B32B 2457/202* (2013.01); *B32B 37/02* (2013.01); *B32B 37/185* (2013.01); *G02F 1/133536* (2013.01); *G02F 1/1303* (2013.01)
USPC ............................ 156/248; 156/249; 156/719

(58) Field of Classification Search
USPC .......................... 156/247, 249, 289, 701, 719
See application file for complete search history.

(56) References Cited

U.S. PATENT DOCUMENTS 8,568,873 B2 * 10/2013 Kusama et al. ............... 428/345
2003/0086169 A1 * 5/2003 Kawamoto et al. ........... 359/485

(Continued)

FOREIGN PATENT DOCUMENTS

| JP | 2002-196141 A | 7/2002 |
| JP | 2004-250213 A | 9/2004 |

(Continued)

OTHER PUBLICATIONS

Korean Office Action dated Jul. 21, 2014, issued in related Korean Patent Application No. 10-2013-7022578, w/ English translation (21 pages).

(Continued)

*Primary Examiner* — Sing P Chan
(74) *Attorney, Agent, or Firm* — Westerman, Hattori, Daniels & Adrian, LLP

(57) ABSTRACT

The method for manufacturing a liquid crystal display device includes carrier film feeding steps including feeding long carrier films from continuous rolls, respectively; peeling steps including folding back each of the carrier films at a front end part placed on a carrier film feed path so that the optical films are peeled off from the carrier films, respectively; and bonding steps including bonding the optical films to the viewer side and back side of a liquid crystal panel, wherein in the bonding steps, the optical films are bonded to the liquid crystal panel in such a manner that the number of times the optical film is bonded to the back side of the liquid crystal panel is greater than the number of times the optical film is bonded to the viewer side of the liquid crystal panel.

11 Claims, 8 Drawing Sheets

(56) References Cited

U.S. PATENT DOCUMENTS

| | | | |
|---|---|---|---|
| 2005/0016670 | A1 | 1/2005 | Kanbara et al. |
| 2006/0124248 | A1 | 6/2006 | Kanbara et al. |
| 2006/0246232 | A1* | 11/2006 | Kubo et al. ............. 428/1.31 |
| 2009/0218049 | A1 | 9/2009 | Kanbara et al. |
| 2009/0260738 | A1 | 10/2009 | Kitada et al. |
| 2009/0263608 | A1 | 10/2009 | Kitada et al. |
| 2010/0157195 | A1 | 6/2010 | Miyatake et al. |
| 2010/0186890 | A1 | 7/2010 | Kitada et al. |
| 2010/0206977 | A1 | 8/2010 | Kitada et al. |
| 2010/0212822 | A1 | 8/2010 | Kitada et al. |
| 2010/0258250 | A1 | 10/2010 | Kitada et al. |
| 2010/0282406 | A1 | 11/2010 | Kitada et al. |
| 2010/0294418 | A1* | 11/2010 | Yura et al. ................ 156/64 |
| 2010/0300606 | A1 | 12/2010 | Kitada et al. |
| 2011/0104423 | A1 | 5/2011 | Kitada et al. |
| 2011/0111667 | A1 | 5/2011 | Kitada et al. |
| 2011/0126988 | A1 | 6/2011 | Kitada et al. |
| 2012/0312462 | A1 | 12/2012 | Hirata et al. |
| 2013/0037219 | A1 | 2/2013 | Kitada et al. |
| 2013/0044374 | A1 | 2/2013 | Kitada et al. |
| 2013/0045350 | A1 | 2/2013 | Kitada et al. |
| 2013/0168016 | A1 | 7/2013 | Kitada et al. |
| 2014/0085723 | A1 | 3/2014 | Hada et al. |
| 2014/0090779 | A1 | 4/2014 | Hada et al. |

FOREIGN PATENT DOCUMENTS

| | | | |
|---|---|---|---|
| JP | 2004-262071 | A | 9/2004 |
| JP | 2005-037417 | A | 2/2005 |
| JP | 2008-003188 | A | 1/2008 |
| JP | 2009-009062 | A | 1/2009 |
| JP | 4307510 | B1 | 8/2009 |
| JP | 2009-271516 | A | 11/2009 |
| JP | 4406043 | B2 | 1/2010 |
| JP | 2010-256757 | A | 11/2010 |
| JP | 2011-81421 | A | 4/2011 |
| JP | 2012-128409 | A | 7/2012 |
| KR | 10-2011-0011689 | A | 2/2011 |
| WO | 2010/131597 | A1 | 11/2010 |
| WO | 2012/070485 | A1 | 5/2012 |

OTHER PUBLICATIONS

International Search Report for PCT/JP2012/061601, Mailing Date of Aug. 14, 2012.

Notification of Transmittal of Copies of Translation of International Preliminary Report on Patentability (Form PCT/IB/338) of International Application No. PCT/JP2012/061601 mailed Nov. 28, 2013 with Forms PCT/IB/373 and PCT/ISA/237.

International Search Report for PCT/JP2012/061818, Mailing Date of Jun. 12, 2012.

Notification of Transmittal of Copies of Translation of the International Preliminary Report on Patentability (Form PCT/IB/338) of International Application No. PCT/JP2012/061818 mailed Nov. 28, 2013 with Forms PCT/IB/373 and PCT/ISA/237.

* cited by examiner

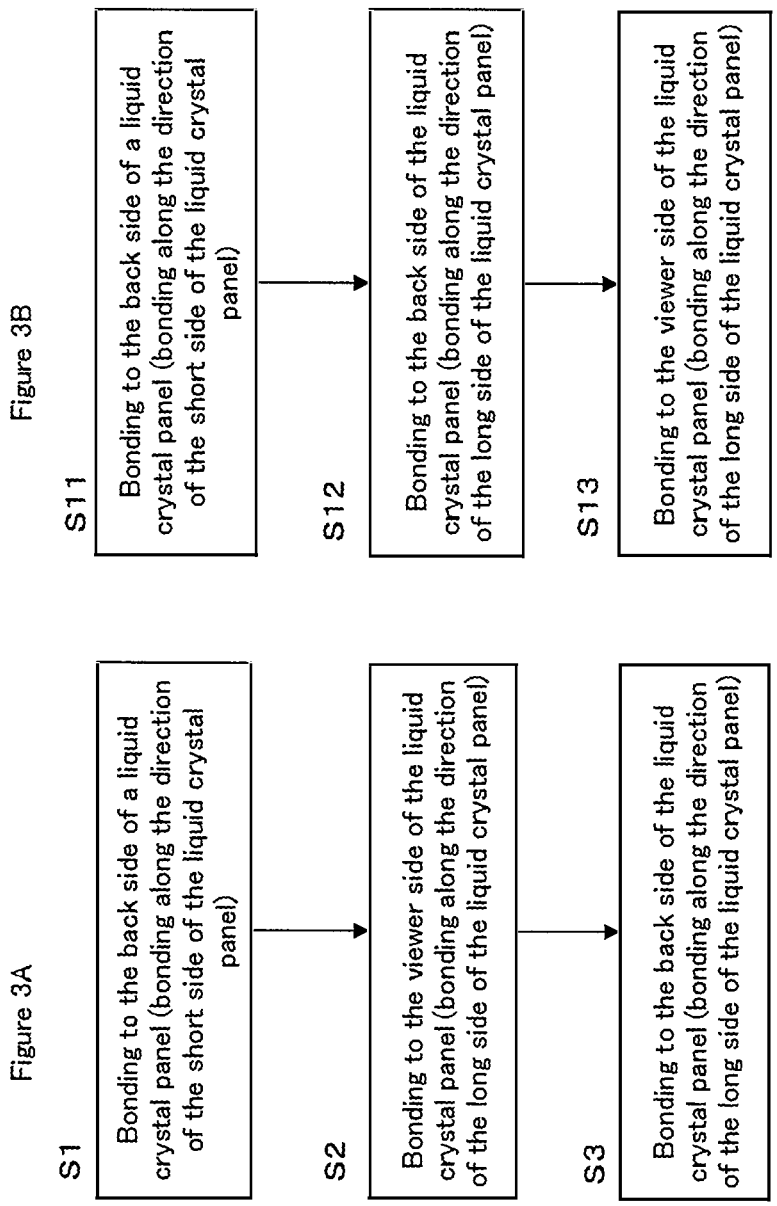

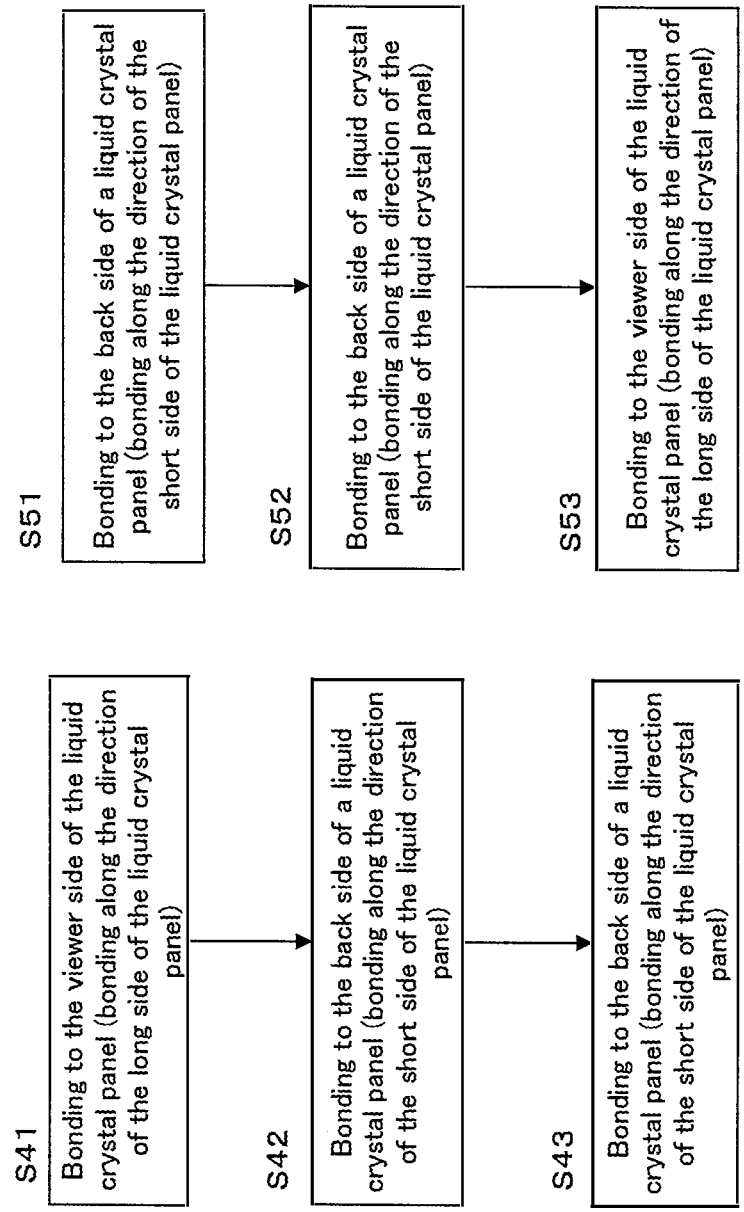

<Method for measuring the amount of warping>

<Mechanism for the occurrence of unevenness>

Warping toward the viewer side causes the liquid crystal panel to be pressed against the bezel and to be bent, so that unevenness is more likely to occur.

Warping toward the back side produces relatively low distorsion, although pressing against the bezel occurs.

METHOD AND SYSTEM FOR MANUFACTURING LIQUID CRYSTAL DISPLAY DEVICE

BACKGROUND OF THE INVENTION

1. Field of the Invention

The invention relates to a method and a system for manufacturing a liquid crystal display device.

2. Description of the Related Art

A conventional process of placing optical films on a liquid crystal panel includes cutting an optical film into a piece and bonding the piece of the optical film (sheet piece) to the liquid crystal panel. In such a bonding process, the tension on the optical film is very low and stable, and therefore, after the bonding, the liquid crystal panel is less likely to be warped due to variations in tension or over-tension. In recent years, an apparatus for simultaneously bonding pieces of optical films to both sides of a liquid crystal panel has been developed, which makes it easy to form uniform bonding states for the front and back sides during the bonding.

On the other hand, it is known that there is a process including feeding a long carrier film from a continuous roll, wherein the continuous roll is a roll of a laminate including the long carrier film and an optical film placed thereon, peeling off the optical film from the carrier film, and bonding the optical film to a liquid crystal panel (hereinafter referred to as "roll bonding process").

(See Japanese Patent Application Laid-Open (JP-A) No. 2005-37417).

SUMMARY OF THE INVENTION

In the roll bonding process, the carrier film is folded back at the front end part of a peeling unit, so that the optical film (carrying a pressure-sensitive adhesive) is directly bonded to the liquid crystal panel, while it is peeled off from the carrier film. Of course, also during the bonding, a state in which the carrier film and the optical film are bonded together with a pressure-sensitive adhesive is maintained, and the bonding is influenced by the tension necessary for the feeding of the carrier film, specifically, influenced by over-tension or variations in tension during the bonding.

As mentioned above, the roll bonding process is influenced by the tension during the feeding, so that the liquid crystal panel may be warped. If a warped liquid crystal panel is incorporated into a liquid crystal TV module, it may interfere with a backlight unit, or stress may be applied from a bezel (outer frame), so that the liquid crystal panel may be distorted. This may alter the cell gap of the liquid crystal panel to cause unevenness (see FIG. 7). It is however known that the situations where these problems occur are influenced by a backlight or the like and that the problems are less likely to occur when the panel is warped toward the back side. As used herein, the term "warped toward the back side" means that the back side is warped in a concave shape, while the viewer side is warped in a convex shape. The same applies to the below.

Therefore, if the warping direction can be controlled in the roll bonding process where a liquid crystal panel is more likely to be warped, it will be very advantageous in manufacture. It is therefore an object of the invention, which has been accomplished in view of the above circumstances, to provide liquid crystal display device manufacturing method and system that can control the direction of warping of a liquid crystal panel as desired.

As a result of earnest studies, the inventors have found that in the roll bonding process, the liquid crystal panel is warped toward the side where the number of laminated optical films (the number of times of bonding) is greater (the back side or the viewer side). Therefore, display unevenness of the panel installed in a liquid crystal TV module can be reduced when the number of times of lamination (the number of times of bonding) is set greater on the back side, where the influence is relatively small. It will be obvious that warping toward the back side should be restricted, although it is effective, because over-warping will cause a problem such as interference with a bezel regardless of whether the warping is toward the viewer side or the back side. According to the invention, the amount of warping is also controllable.

The invention is directed to a method for manufacturing a liquid crystal display device, including: carrier film feeding steps including feeding long carrier films from continuous rolls, respectively, wherein the continuous rolls include rolls of laminates including the long carrier films and pressure-sensitive adhesive-carrying optical films each with a specific width placed on the carrier films, respectively; peeling steps including folding back each of the carrier films at a front end part placed on a carrier film feed path so that the optical films are peeled off from the carrier films, respectively; and bonding steps including bonding the optical films, which are peeled off or being peeled off in the peeling steps, to the viewer side and back side of a liquid crystal panel, wherein in the bonding steps, the optical films are bonded to the liquid crystal panel in such a manner that the number of times the optical film is bonded to the back side of the liquid crystal panel is greater than the number of times the optical film is bonded to the viewer side of the liquid crystal panel.

This process makes it possible to warp the liquid crystal panel toward the back side, so that the interference between the liquid crystal panel and a bezel or a backlight unit can be reduced, which makes it possible to suppress panel distortion and to reduce display unevenness of the liquid crystal panel.

A mechanism for the occurrence of warping of a liquid crystal panel is described below with reference to FIGS. 1 and 2. As shown in FIG. 2, a liquid crystal panel is warped when stress (a restoring force against a tension) is generated on an optical film by a tension on the optical film (a pulling force along the bonding direction) during the bonding of the optical film to the liquid crystal panel and when the liquid crystal panel follows a pressure-sensitive adhesive according to the corresponding stress (relaxation of the tension). The balance between the warping forces on the viewer side and the back-side determines the final warping direction. In an example of the warping direction shown in FIG. 1, the liquid crystal panel is warped toward the back side because a single optical film is bonded to the viewer side of the liquid crystal panel, while two optical films are bonded to the back side, so that the stress is greater on the back side than on the viewer side, and therefore the liquid crystal panel is warped toward the back side. It will be understood that the stress on the optical film depends on the tension during the bonding and the stiffness of the optical film and that how the liquid crystal panel follows the pressure-sensitive adhesive varies with the ability of the pressure-sensitive adhesive to relax the stress (the function of reducing the stress on the film).

The tension on the optical film during the bonding is determined as the average of the values measured by tension pickups placed on the downstream side of the bonding process, and for example, it is in the range of 0.5 to 7.5 [N/cm], preferably in the range of 1.0 to 5.0 [N/cm], more preferably in the range of 1.5 to 3.5 [N/cm]. If the tension is too low, the film will be loosened so that wrinkles, bubbles, or bonding misalignment will occur, and if it is too high, bonding misalignment will occur.

The pressure-sensitive adhesive should have a storage modulus of $1.0 \times 10^4$ to $5.0 \times 10^4$ [GPa], which is an indicator of the ability of the pressure-sensitive adhesive to relax stress.

As described above, the most significant factor is the influence of the integration (sum) of the tensions based on the difference in the number of times of bonding of the optical film to the liquid crystal panel.

In an embodiment of the invention, the bonding steps may include bonding the optical film first to the back side of the liquid crystal panel.

This feature is preferred because it can increase the warping toward the back side.

The direction of warping of the liquid crystal panel is changed during the plurality of optical film-bonding steps. Concerning the time series of the warping direction, when the optical film is first bonded to one side (e.g., the back side) of the liquid crystal panel, the liquid crystal panel is temporarily warped toward the one side (e.g., the back side). Subsequently, when the optical film is bonded to the other side (e.g., the viewer side), the liquid crystal panel tends to be warped toward the other side (the viewer side). Namely, the liquid crystal panel is temporarily warped toward one side (e.g., the back side) to which the optical film is first bonded. To reduce or cancel this warping, a certain force for warping in the reverse direction should be applied to the other side (e.g., the viewer side), and the side on which the first bonding step is performed is also a significant factor. Therefore, the optical film is preferably bonded first to the back side.

In the bonding steps according to an embodiment of the invention, the optical films are preferably bonded to the viewer side and back side of the liquid crystal panel in such a manner that the directions in which the optical films are bonded to the back side of the liquid crystal panel share a common direction with the direction or directions in which the optical film or films are bonded to the viewer side of the liquid crystal panel.

According to this feature, a pair of the optical films bonded in the same direction can act to cancel the stresses together, so that the liquid crystal panel is warped by the stress on the optical film bonded in the final direction where the stress finally remains without being cancelled (see for example FIG. 5). In a preferred mode, therefore, the optical film is bonded finally to the back side so that stress can remain on the back side without being cancelled. This feature is preferred because the warping can be cancelled out in the liquid crystal panel, so that the warping after the cancellation is not significant and the total amount of warping can be controlled to be small.

In an embodiment of the invention, one of the optical films bonded to the back side of the liquid crystal panel may be a reflective polarizing film with a multilayer structure.

According to this feature, when one of the optical films bonded to the back side of the liquid crystal panel is a reflective polarizing film with a multilayer structure, the liquid crystal panel can be reliability warped concave toward the back side, because the reflective polarizing film with a multilayer structure can be significantly shrunk by heating.

The final black brightness of the liquid crystal panel depends on the accuracy of the orthogonal axes of the polarizing films placed on the front and back sides, but the reflective polarizing film does not contribute to the black brightness quality of the final image, because it is used as a brightness-enhancing functional layer in the liquid crystal panel. Therefore, the accuracy required for the bonding position of the reflective polarizing film is lower than that of a general polarizing film. Before the bonding, the liquid crystal panel is generally aligned, but in the process of laminating films, an optical film (such as a polarizing film) already bonded to the liquid crystal panel is displaced to a certain extent relative to the liquid crystal panel, and the bonding should be performed taking it into account. In the final bonding step, therefore, a reflective polarizing film is preferably used, because it can have a certain margin for axis displacement in advance.

In another mode, the invention is directed to a system for manufacturing a liquid crystal display device, including: carrier film feed units for feeding long carrier films from continuous rolls, respectively, wherein the continuous rolls include rolls of laminates including the long carrier films and pressure-sensitive adhesive-carrying optical films each with a specific width placed on the carrier films, respectively; peeling units that each have a front end part, are each placed on a carrier film feed path, and are each configured to peel off the optical film from the carrier film in such a manner that it folds back the carrier film at the front end part; and bonding units for bonding the optical films, which are peeled off or being peeled off in the peeling units, to the viewer side and back side of a liquid crystal panel, wherein the bonding units are so configured as to bond the optical films to the liquid crystal panel in such a manner that the number of times the optical film is bonded to the back side of the liquid crystal panel is greater than the number of times the optical film is bonded to the viewer side of the liquid crystal panel.

This system can warp the liquid crystal panel toward the back side, so that it can reduce interference with a bezel and interference with a backlight unit, suppress panel distortion, and reduce display unevenness of the liquid crystal panel.

In an embodiment of the invention, the bonding units may be so configured that the optical film is bonded first to the back side of the liquid crystal panel.

In an embodiment of the invention, the bonding units may be so configured that the optical films are bonded to the viewer side and back side of the liquid crystal panel in such a manner that the directions in which the optical films are bonded to the back side of the liquid crystal panel share a common direction with the direction or directions in which the optical film or films are bonded to the viewer side of the liquid crystal panel.

In an embodiment of the invention, one of the optical films bonded to the back side of the liquid crystal panel may be a reflective polarizing film with a multilayer structure.

BRIEF DESCRIPTION OF THE DRAWINGS

FIGS. 3A to 3F are flow charts showing liquid crystal display device-manufacturing methods;

DETAILED DESCRIPTION OF THE PREFERRED EMBODIMENTS

Figure 1:
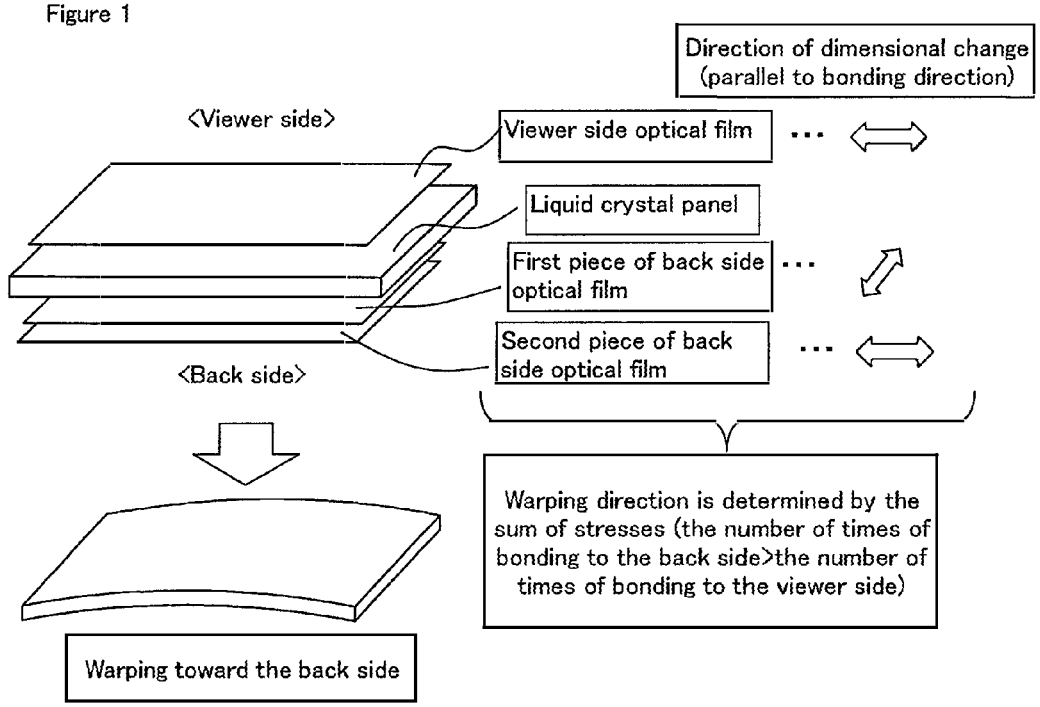
FIG. 1 is a diagram for illustrating warping of a liquid crystal panel.
Figure 2:
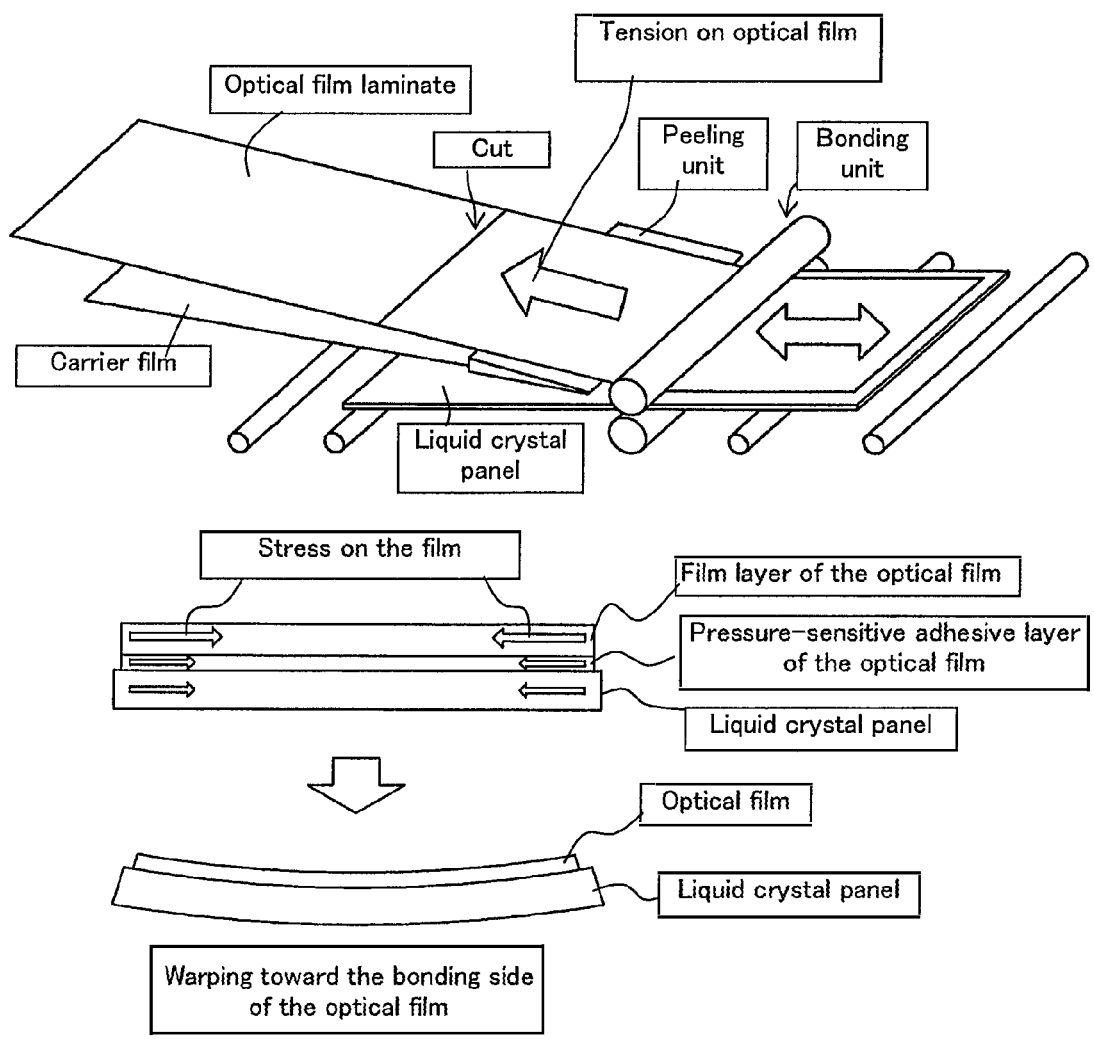
FIG. 2 is a diagram for illustrating warping of a liquid crystal panel.

Each optical film may be of any type having a pressure-sensitive adhesive layer as an outermost layer, and it may be a monolayer film or a multilayer laminated film. For example, each optical film may be a plastic film with a thickness of about 50 to about 300 µm. The elastic modulus of each optical film may be determined by a process including pulling the optical film (a strip-shaped test piece of 25 cm×100 cm) under an environment at a temperature of 25° C. using a tensile/compression tester and determining the elastic modulus of the optical film from the resulting S-S curve. The elastic modulus may be in the range of 0.5 to 10.0 [GPa], preferably in the range of 1.0 to 8.0 [GPa], more preferably in the range of 2.0 to 6.0 [GPa]. If the elastic modulus is less than 0.5 [GPa], wrinkles may occur, and if it is more than 10.0 [GPa], accidental peeling may occur during feeding.

For example, the optical film may be a polarizer or a polarizing film, and the polarizing film may have a structure including a polarizer and a polarizer protecting film or films placed on one or both sides of the polarizer. A surface protective film or films may also be placed thereon to protect the polarizer or the polarizing film from scratches and others during transportation. Other examples of the optical film include optical compensation films such as retardation films and brightness enhancement films. The multilayer-structure optical film may include a polarizer or a polarizing film and a retardation film and/or a brightness enhancement film placed on the polarizer or polarizing film. Hereinafter, the term. "MD polarizing film" refers to an elongated polarizing film having an absorption axis in the longitudinal direction, in which the polarizer has an absorption axis in the stretched direction, and the term "TD polarizing film" refers to an elongated polarizing film having an absorption axis in the transverse direction (widthwise direction).

For example, the polarizing film may be a dichroic polarizing film. The dichroic polarizing film may be manufactured by a process including the steps of (A) dyeing, crosslinking, stretching, and drying a polyvinyl alcohol-based film to obtain a polarizer; (B) bonding a protecting layer or layers to one or both sides of the polarizer; and (C) heat-treating the resulting laminate. Dyeing, crosslinking, and stretching of the polyvinyl alcohol-based film do not have to be each independently performed, and may be performed simultaneously, or they may be performed in any order. It will be understood that a polyvinyl alcohol-based film having undergone a swelling treatment may also be used the polyvinyl alcohol-based film. In general, the polyvinyl alcohol-based film is immersed in a solution containing iodine or a dichroic dye so that the film is dyed with the adsorbed iodine or dichroic dye, then cleaned, uniaxially stretched to a stretch ratio of 3 to 7 in boric acid or a solution containing boric acid and other additives, and then dried.

For example, the brightness enhancement film may be a reflective polarizing film having a multilayer structure with a reflection axis and a transmission axis. For example, the reflective polarizing film can be obtained by alternately stacking a plurality of polymer films A and B made of two different materials and stretching them. The refractive index of only the material A is changed and increased in the stretching direction, so that birefringence is produced, in which a reflection axis is formed in the stretching direction where there is a difference in refractive index at the material A-B interface, and a transmission axis is formed in the direction (non-stretching direction) where no difference in refractive index is produced. This reflective polarizing film has a transmission axis in the longitudinal direction and an absorption axis in the transverse direction (widthwise direction).

The pressure-sensitive adhesive in the optical film is typically, but not limited to, an acrylic pressure-sensitive adhesive, a silicone-based pressure-sensitive adhesive, a urethane-based pressure-sensitive adhesive, or the like. For example, a plastic film (such as a polyethylene terephthalate-based film or a polyolefin-based film) or any other film may be used to form the carrier film. Any appropriate film such as a film coated with an appropriate release agent such as a silicone, long-chain alkyl or fluoride release agent, or molybdenum sulfide may also be used as needed.

In an embodiment of the invention, the optical film may be formed on the carrier film in any mode. For example, they may be wound to form a continuous roll. For example, the continuous roll may be (1) a roll of an optical film laminate including a carrier film and a pressure-sensitive adhesive-carrying optical film formed on the carrier film. In this case, the system for continuously manufacturing a liquid crystal display device has cutting means for cutting the optical film into sheet pieces of the optical film in such a manner that the optical film (carrying the pressure-sensitive adhesive) is cut at predetermined intervals, while the carrier film is left uncut (cutting means for performing half-cutting). For example, the cutting may be performed in such a manner as to classify non-defective and defective sheet pieces based on the result of an inspection performed using a defect inspection apparatus in the continuous manufacturing system.

Alternatively, for example, the continuous roll may be (2) a roll of an optical film laminate including a carrier film and sheet pieces of pressure-sensitive adhesive-carrying optical film formed on the carrier film (a continuous roll of a so-called scored optical film).

The liquid crystal display device includes a liquid crystal panel and at least a sheet piece or pieces of polarizing film provided on one or both sides of the liquid crystal panel, into which a driving circuit is incorporated as needed. The liquid crystal panel to be used may be of any type such as a vertical alignment (VA) type or an in-plane switching (IPS) type. The liquid crystal panel 4 shown in FIG. 4 has a structure including a pair of substrates (a backside substrate 4a and a viewer side substrate 4b) opposed to each other and a liquid crystal layer sealed in between the substrates.

Embodiment 1

(Method for Manufacturing Liquid Crystal Display Device)

The liquid crystal display device manufacturing method includes: carrier film feeding steps including feeding long carrier films from continuous rolls, respectively, wherein the continuous rolls include rolls of laminates including the long carrier films and pressure-sensitive adhesive-carrying optical films each with a specific width placed on the carrier films, respectively; peeling steps including folding back each of the carrier films at a front end part placed on a carrier film feed path so that the optical films are peeled off from the carrier films, respectively; and bonding steps including bonding the optical films, which are peeled off or being peeled off in the peeling steps, to the viewer side and back side of a liquid crystal panel, wherein in the bonding steps, the optical films are bonded to the liquid crystal panel in such a manner that the number of times the optical film is bonded to the back side of the liquid crystal panel is greater than the number of times the optical film is bonded to the viewer side of the liquid crystal panel.

In the carrier film feeding steps, each optical film laminate (a laminated film including a carrier film and an optical film placed thereon) is drawn from each continuous roll and fed to the downstream side. During the feeding, the optical film is cut at specific intervals in the film widthwise direction perpendicular to the longitudinal direction, while the carrier film is left uncut, so that a sheet piece of the optical film is formed on the carrier film. When the continuous roll is a roll of the scored optical film, this cutting step is unnecessary. In the peeling steps, each carrier film is inwardly folded back at a front end part of a peeling unit so that a sheet piece of the optical film is peeled off from the carrier film and supplied to the bonding position in a bonding unit. The bonding steps include bonding, to the liquid crystal panel, sheet pieces of the optical films which are each peeled off or being peeled off in the peeling step. The carrier film feeding step, the peeling step, and the bonding step are continuously performed to bond a single sheet piece of the optical film to the liquid crystal panel. These steps can constitute one roll bonding process, and sheet pieces of the optical films can be sequentially bonded to both sides (the viewer side and the back side) of the liquid crystal panel by a plurality of the roll bonding processes.

In the plurality of the bonding steps, sheet pieces of the optical films are bonded to the liquid crystal panel in such a manner that the number of times the sheet piece of the optical film is bonded to the back side of the liquid crystal panel is greater than the number of times the sheet piece of the optical film is bonded to the viewer side of the liquid crystal panel. This is performed to warp the liquid crystal panel toward the back side.

Figure 3C:
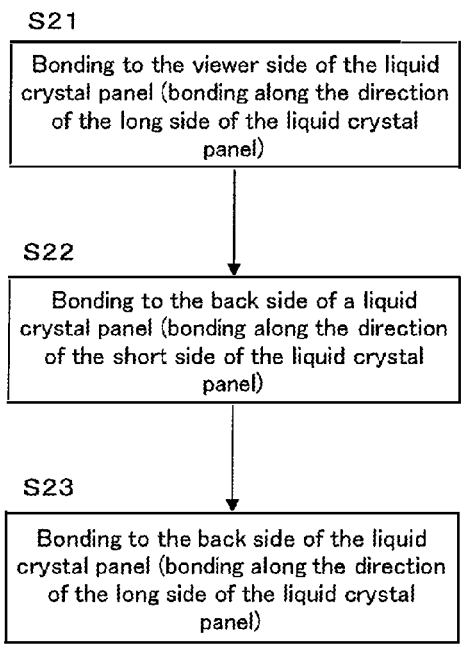
Figure 3D:
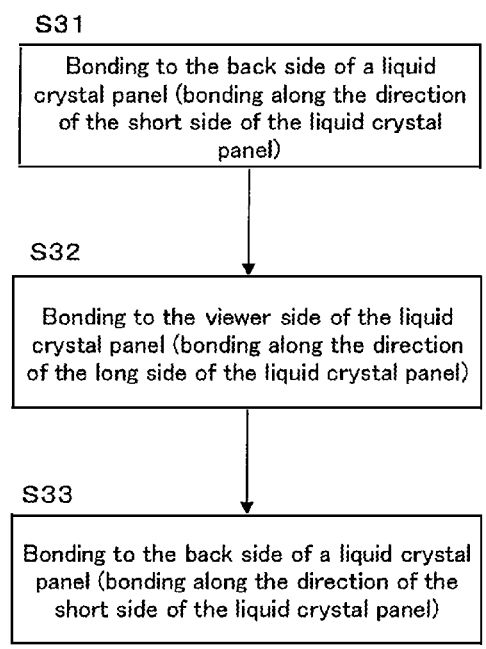

FIGS. 3A to 3F show examples with respect to the bonding order and the bonding direction in the bonding steps. It will be understood that the bonding order, the bonding direction, and the optical film types shown in FIGS. 3A to 3F are not intended to limit embodiments of the invention. FIG. 3A shows a process including bonding an MD polarizing film to the back side of a liquid crystal panel along the direction of the short side of the liquid crystal panel (step S1), then bonding an MD polarizing film to the viewer side of the liquid crystal panel along the direction of the long side of the liquid crystal panel (step S2), and then bonding a reflective polarizing film to the back side of the liquid crystal panel along the direction of the long side of the liquid crystal panel (step S3). FIG. 3B shows a process including bonding an MD polarizing film to the back side of a liquid crystal panel along the direction of the short side of the liquid crystal panel (step S11), then bonding a reflective polarizing film to the back side of the liquid crystal panel along the direction of the long side of the liquid crystal panel (step S12), and then bonding an MD polarizing film to the viewer side of the liquid crystal panel along the direction of the long side of the liquid crystal panel (step S13). FIG. 3C shows a process including bonding an MD polarizing film to the viewer side of a liquid crystal panel along the direction of the long side of the liquid crystal panel (step S21), then bonding an MD polarizing film to the back side of the liquid crystal panel along the direction of the short side of the liquid crystal panel (step S22), and then bonding a reflective polarizing film to the back side of the liquid crystal panel along the direction of the long side of the liquid crystal panel (step S23). FIG. 3D shows a process including bonding a retardation film to the back side of a liquid crystal panel along the direction of the short side of the liquid crystal panel (step S31), then bonding an MD polarizing film to the viewer side of the liquid crystal panel along the direction of the long side of the liquid crystal panel (step S32), and then bonding an MD polarizing film to the back side of the liquid crystal panel along the direction of the short side of the liquid crystal panel (step S33). FIG. 3E shows a process including bonding an MD polarizing film to the viewer side of a liquid crystal panel along the direction of the long side of the liquid crystal panel (step S41), then bonding a retardation film to the back side of the liquid crystal panel along the direction of the short side of the liquid crystal panel (step S42), and then bonding an MD polarizing film to the back side of the liquid crystal panel along the direction of the short side of the liquid crystal panel (step S43). FIG. 3F shows a process including bonding a retardation film to the back side of a liquid crystal panel along the direction of the short side of the liquid crystal panel (step S51), then bonding an MD polarizing film to the back side of the liquid crystal panel along the direction of the short side of the liquid crystal panel (step S52), and then bonding an MD polarizing film to the viewer side of the liquid crystal panel along the direction of the long side of the liquid crystal panel (step S53). The polarizing films may be bonded to the viewer side and back side of the liquid crystal panel so that their absorption axes are orthogonal to each other (crossed-Nicol). Bonding an MD polarizing film to the viewer side along the direction of the long side of the liquid crystal panel is non-limiting, and alternatively, it may be bonded along the direction of the short side, and correspondingly, an MD polarizing film may be bonded to the back side along the direction of the long side of the liquid crystal panel. The MD polarizing film is also non-limiting, and alternatively, a TD polarizing film may also be used.

As shown in FIG. 3A, 3B, 3D, or 3F, the optical film is preferably bonded to the back side of the liquid crystal panel in the first bonding step. As shown in FIG. 3A, 3B, or 3C, the directions in which the optical films are bonded to the back side of the liquid crystal panel preferably share a common direction with the direction or directions in which the optical film or films are bonded to the viewer side of the liquid crystal panel, so that stress can be cancelled out between the corresponding pair of the optical films, which can eventually reduce the amount of warping toward the back side.

Other Embodiments

Another mode of the above embodiment may further include an inspection step including inspecting the optical film for defects (for example, by transmission inspection) before the cutting step for forming the sheet piece, in which cutting may be performed in such a manner that defects are avoided (called skip cutting) based on the result of the inspection step. Alternatively, the skip cutting may be performed while defect information previously attached to the optical film or the carrier film is read out.

(System for Manufacturing Liquid Crystal Display Device)

The liquid crystal display device manufacturing system includes carrier film feed units for feeding long carrier films from continuous rolls, respectively, wherein the continuous rolls include rolls of laminates including long carrier films and pressure-sensitive adhesive-carrying optical films each with a specific width placed on the carrier films, respectively; peeling units that each have a front end part, are each placed on a carrier film feed path, and are each configured to peel off the optical film from the carrier film in such a manner that it folds back the carrier film at the front end part; and bonding units for bonding the optical films, which are peeled off or being peeled off in the peeling units, to the viewer side and back side of a liquid crystal panel, wherein the bonding units are so configured as to bond the optical films to the liquid crystal panel in such a manner that the number of times the optical film is bonded to the back side of the liquid crystal panel is greater than the number of times the optical film is bonded to the viewer side of the liquid crystal panel.

Hereinafter, the liquid crystal display device manufacturing system according to an embodiment of the invention is described with reference to FIG. 4. This manufacturing system includes a plurality of sheet piece lamination apparatuses each having a carrier film feed unit, a peeling unit, and a bonding unit. A first sheet piece lamination apparatus 501 is provided to laminate a sheet piece of an optical film to the back side of a liquid crystal panel along (parallel to) the direction of the short side of the liquid crystal panel. A second sheet piece lamination apparatus 502 is provided to laminate a sheet piece of an optical film to the viewer side of the liquid crystal panel along (parallel to) the direction of the long side of the liquid crystal panel. A third sheet piece lamination apparatus 503 is provided to laminate a sheet piece of an optical film to the sheet piece of the optical film, which has been laminated by the first sheet piece lamination apparatus, on the back side of the liquid crystal panel along (parallel to) the direction of the long side of the liquid crystal panel. The manufacturing system of FIG. 4 includes with the bonding order and the bonding direction shown in FIG. 3A.

Figure 4:
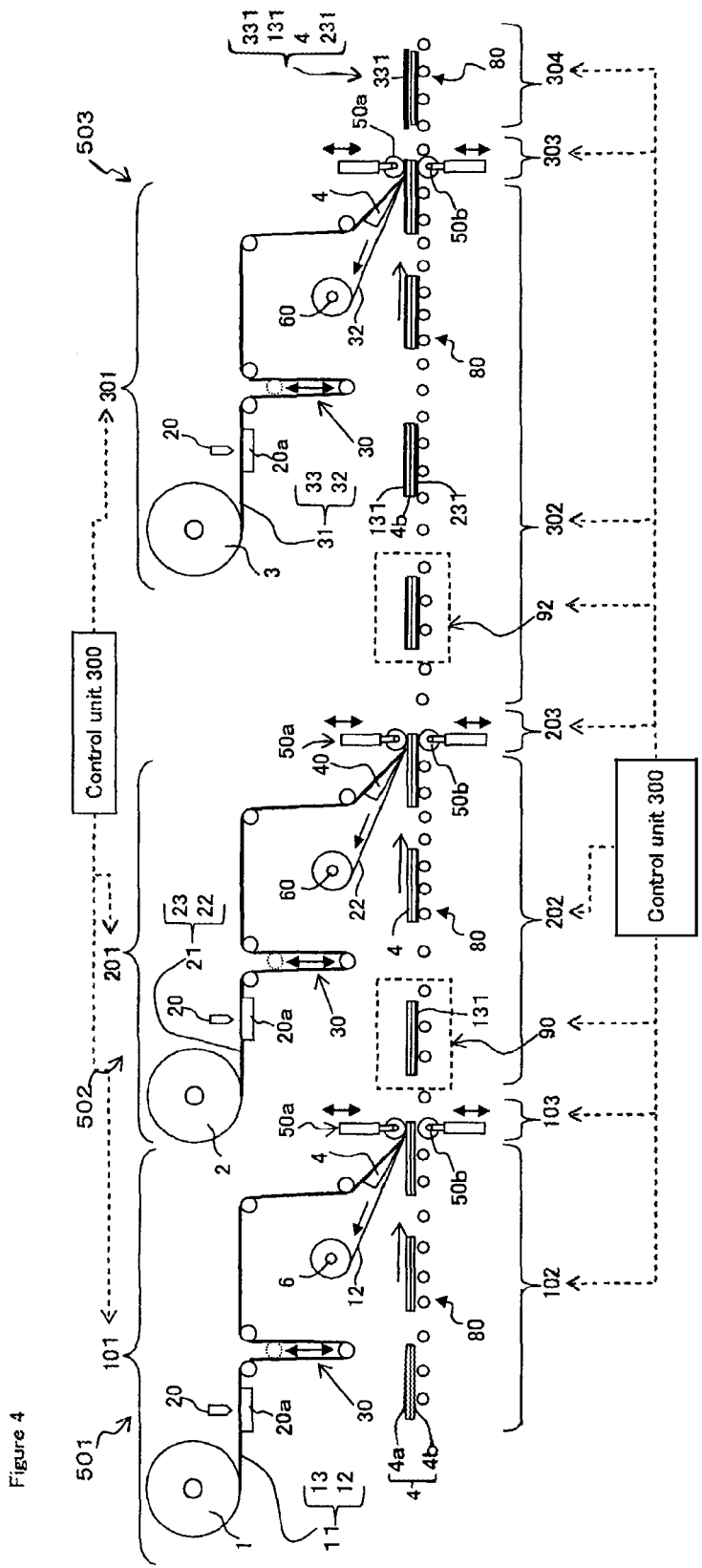
FIG. 4 is a diagram for illustrating a system for manufacturing a liquid crystal display device.
Figure 5:
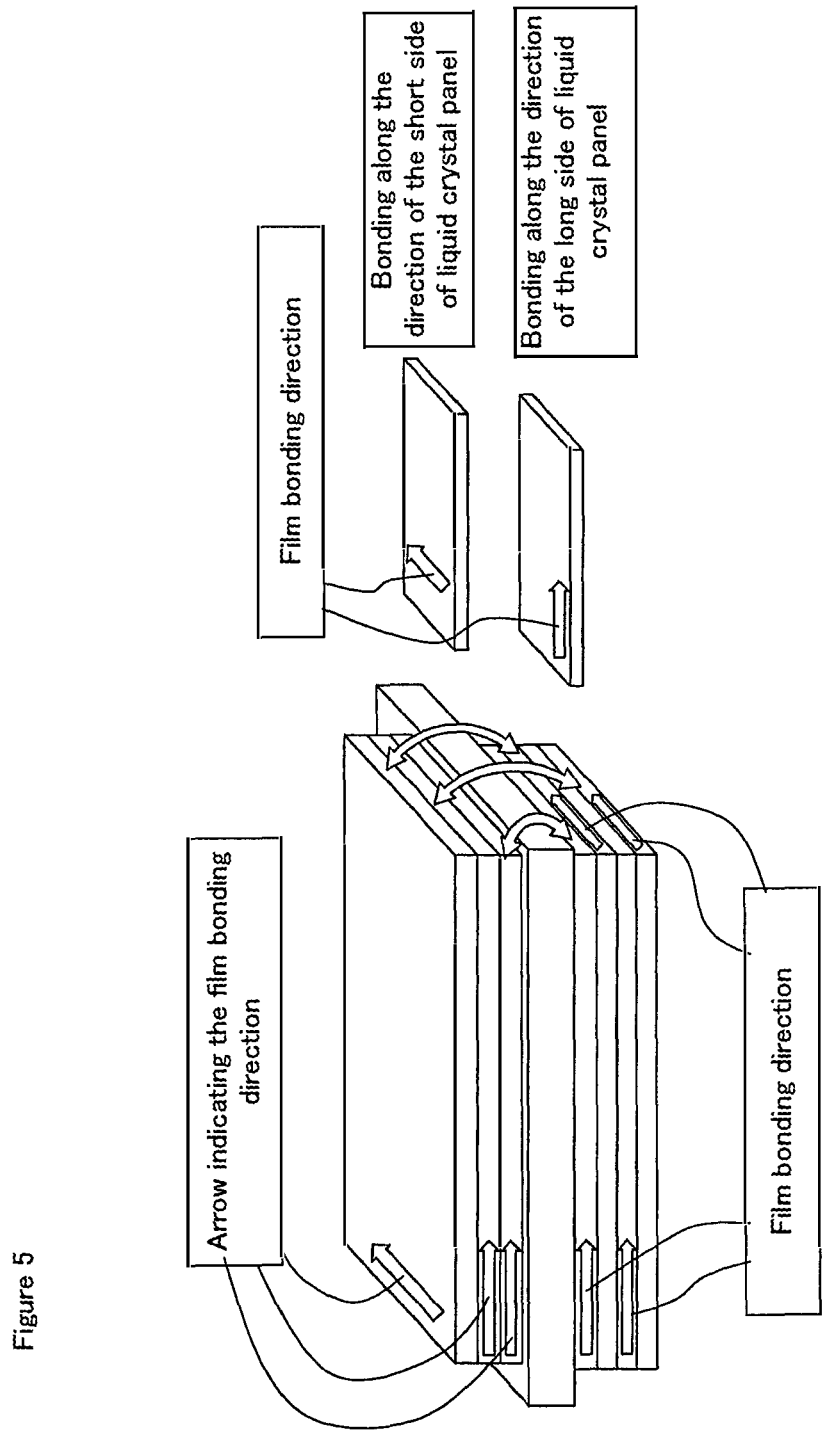
FIG. 5 is a diagram for illustrating the direction of bonding of optical films.

As shown in FIG. 4, the first sheet piece lamination apparatus 501 has a carrier film feed unit 101, a liquid crystal panel feed unit 102, a peeling unit 40, and a bonding unit 103 (including a bonding roller 50a and a driving roller 50b). The second sheet piece lamination apparatus 502 has a carrier film feed unit 201, a liquid crystal panel feed unit 202, a peeling unit 40, and a bonding unit 203 (including a bonding roller 50a and a driving roller 50b). The third sheet piece lamination apparatus 503 has a liquid crystal panel feed unit 302, a carrier film feed unit 301, a peeling unit 40, and a bonding unit 303 (including a bonding roller 50a and a driving roller 50b). In this embodiment, the liquid crystal panel feed unit 102 feeds a liquid crystal panel 4 in a direction parallel to the direction of the short side of the liquid crystal panel 4. A sheet piece 131 of a polarizing film is bonded to the back side 4a (the upper side in FIG. 4) of the liquid crystal panel 4 along the direction of the short side of the liquid crystal panel 4. Subsequently, the liquid crystal panel 4 with the sheet piece 131 bonded thereto is turned over and rotated by 90°. Subsequently, a sheet piece 231 of a polarizing film is bonded to the viewer side 4b (the upper side in FIG. 4) of the liquid crystal panel 4 along the direction of the long side of the liquid crystal panel 4. Subsequently, the liquid crystal panel 4 is turned over, and a sheet piece 331 of a reflective polarizing film is bonded to the back side 4a (the upper side in the drawing) of the liquid crystal panel 4 along the direction of the long side of the liquid crystal panel 4. It will be understood that this bonding method is non-limiting and that one or both of the sheet pieces of the polarizing films may be bonded to the liquid crystal panel from the lower side, and the sheet piece of the reflective polarizing film may be bonded to the liquid crystal panel from the lower side.

(Sheet Piece Lamination Apparatuses)

First, a description is given of the first sheet piece lamination apparatus 501. The liquid crystal panel feed unit 102 feeds the liquid crystal panel 4 to the bonding unit 103. In this embodiment, the liquid crystal panel feed unit 102 includes a feed roller 80, a suction plate, and other components. The liquid crystal panel 4 is fed to the downstream side of the manufacturing line by rotating the feed roller 80 or shifting the suction plate.

The carrier film feed unit 101 draws a long optical film laminate 11 from a continuous roll 1, wherein the laminate 11 includes a long carrier film 12 and a pressure-sensitive adhesive-carrying long polarizing film 13 placed thereon, and cuts the polarizing film 13 at predetermined intervals while leaving the carrier film 12 uncut, so that a sheet piece 131 of the polarizing film is formed on the carrier film 12. For the operation, the carrier film feed unit 101 has a cutting part 20, a dancer roller 30, and a take-up part 60.

The cutting part 20 holds the carrier film 12 by a suction part 20a and cuts the polarizing film 13 at predetermined intervals, while leaving the carrier film 12 uncut, so that a sheet piece 131 of the polarizing film is formed on the carrier film 12. For example, the cutting part 20 may be a cutter, a laser, or the like.

The dancer roller 30 has the functions of maintaining tension on the carrier film 12 and absorbing feed misalignment between the cutting part 20 and the bonding unit 103. The carrier film feed unit 101 feeds the carrier film 12 via the dancer roller 30.

The take-up part 60 takes up the carrier film 12 from which the sheet piece 131 is peeled off. The system may further include a feed roller between the bonding unit 103 and the take-up part 60.

The peeling unit 40 inwardly folds back the carrier film 12 at its front end part to peel off the sheet piece 131 (carrying the pressure-sensitive adhesive) of the polarizing film from the carrier film 12 and feeds the sheet piece 131 to the bonding position in the bonding unit 103. In this embodiment, a sharp knife edge part is used as a non-limiting example of the front end part of the peeling unit 40.

The bonding unit 103 bonds the sheet piece 131 of the polarizing film, which is peeled off in the peeling unit 40, to the back side (upper side) of the liquid crystal panel 4 supplied by the liquid crystal panel feed unit 102. In this embodiment, the bonding unit 103 includes a bonding roller 50a and a driving roller 50b.

The second sheet piece lamination apparatus 502 will be described briefly, because it includes the same components as the first sheet piece lamination apparatus 501 and each component represented by the same reference character has the same function.

The liquid crystal panel feed unit 202 feeds the liquid crystal panel 4 to the bonding unit 203. The liquid crystal panel feed unit 202 includes a turnover-rotation unit 90 having a turnover part for turning over the liquid crystal panel 4 and a rotation part for rotating it by 90°. The carrier film feed unit 201 draws and feeds a long optical film laminate 21 from a continuous roll 2, wherein the laminate 21 includes a long carrier film 22 and a pressure-sensitive adhesive-carrying long polarizing film 23 placed thereon. The cutting unit 20 holds the carrier film 22 by a suction part 20a and cuts the polarizing film 23 at predetermined intervals, while leaving the carrier film 22 uncut, so that a sheet piece 231 of the polarizing film is formed on the carrier film 22. The peeling unit 40 inwardly folds back the carrier film 22 at its front end part to peel off the sheet piece 231 of the polarizing film (carrying the pressure-sensitive adhesive) from the carrier film 22, and feeds the sheet piece 231 to the bonding unit 203. The bonding unit 203 bonds the sheet piece 231 of the polarizing film, which is peeled off by the peeling unit 40, to the viewer side (upper side) of the liquid crystal panel 4 fed by the liquid crystal panel feed unit 202.

The third sheet piece lamination apparatus 503 will be described briefly, because it includes the same components as the first sheet piece lamination apparatus 501 and each component represented by the same reference character has the same function. The third sheet piece lamination apparatus 503 is an apparatus for bonding a sheet piece 331 of a reflective polarizing film to the sheet piece 131 of the polarizing film placed on the back side of the liquid crystal panel 4.

The liquid crystal panel feed unit 302 feeds the liquid crystal panel 4, to both sides of which the sheet pieces 131 and 231 are bonded by the bonding units 103 and 203, to the bonding unit 303. The liquid crystal panel feed unit 302 includes a turnover part 92 for turning over the liquid crystal panel 4. The carrier film feed unit 301 draws a long optical film laminate 31 from a continuous roll 3 and feeds the laminate 31 to the downstream side, wherein the laminate 31 includes a long carrier film 32 and a pressure-sensitive adhesive-carrying long reflective polarizing film 33 placed thereon. The cutting unit 20 holds the carrier film 32 by a suction part 20a and cuts the reflective polarizing film 33 at predetermined intervals, while leaving the carrier film 32 uncut, so that a sheet piece 331 of the reflective polarizing film is formed on the carrier film 32. The peeling unit 40 inwardly folds back the carrier film 32 at its front end part to peel off the sheet piece 331 of the reflective polarizing film (carrying the pressure-sensitive adhesive) from the carrier film 32, and feeds the sheet piece 331 to the bonding unit 303. The bonding unit 303 bonds the sheet piece 331 of the reflective polarizing film, which is peeled off by the peeling unit 40, to the back side (upper side) of the liquid crystal panel 4, which is fed by the liquid crystal panel feed unit 302, with the pressure-sensitive adhesive interposed therebetween. Specifically, the sheet piece 331 of the reflective polarizing film is bonded to the sheet piece 131 of the polarizing film.

(Control Unit)

A control unit 300 is provided to control the cutting part 20 and the carrier film feed units 101, 201, and 301 so that it controls the formation of the sheet pieces 131 and 231 of the polarizing films by cutting and the formation of the sheet piece 231 of the reflective polarizing film by cutting. The control unit 300 also controls the liquid crystal panel feed units 102, 202, 302, and 304, the turnover-rotation unit 90, the turnover part 92, and the bonding units 103, 203, and 303.

The liquid crystal panel feed unit 304 feeds the liquid crystal panel 4 (liquid crystal display device) to the downstream side, wherein the sheet pieces 131 and 231 of the polarizing films are bonded to both sides of the panel 4, and the sheet piece 331 of the reflective polarizing film is bonded to the back side of the panel 4.

Any other sheet piece lamination apparatus or apparatuses may be used at feed downstream sites to bond a sheet piece or pieces of an optical film or films.

For example, the timing of the operation of each apparatus is calculated by a detecting method using sensors placed at specific locations or by a method of detecting the rotating part of the feeder or the feeding mechanism with a rotary encoder or the like. The control unit 300 may be implemented in cooperation with software programs and hardware resources such as CPU and memories. In this case, program software, procedures, various settings, etc. are previously stored in memories. Private circuits, firmware, or the like may also be used for the implementation.

EXAMPLES

Different optical films were bonded to a liquid crystal panel (40 inch size) using the manufacturing system shown in FIG. 4. The manufacturing system was configured to perform the turnover and 90° rotation of the liquid crystal panel appropriately depending on the optical film type and the bonding order. When long optical films are cut into sheet pieces, the sizes of the sheet pieces are determined depending on the bonding side and the bonding direction.

The optical films used were a MD polarizing film (VEGQ1724DU manufactured by NITTO DENKO CORPORATION), a retardation film (ZEONOR Film manufactured by ZEON CORPORATION), and a reflective polarizing film (DBEF manufactured by 3M Company). In each example and comparative example, conditions were set up for the optical films, the bonding side of the liquid crystal panel (the back side or the viewer side), and the bonding direction (the direction of the long or short side), and evaluations were made of the direction and amount of warping of the liquid crystal panel and the appearance (unevenness) in a case where the liquid crystal panel was incorporated into a bezel. Concerning the bonding direction, "long side direction" means that the bonding is performed along (parallel to) the direction of the long side of the panel, and "short side direction" means that the bonding is performed along (parallel to) the direction of the short side of the panel. The tension [N/cm] indicates the tension on the sheet piece of each optical film during the bonding. The tension on the retardation film (ZEONOR Film manufactured by ZEON CORPORATION) is set higher than that on the polarizing film, because the retardation film is relatively thin and low in stiffness and therefore more likely to become wrinkled.

Figure 6:
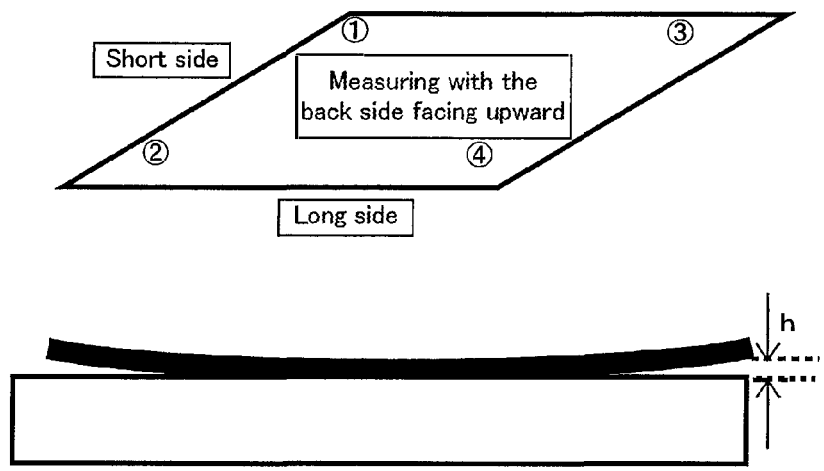
FIG. 6 is a diagram for illustrating a method for measuring the amount of warping.
Figure 7:
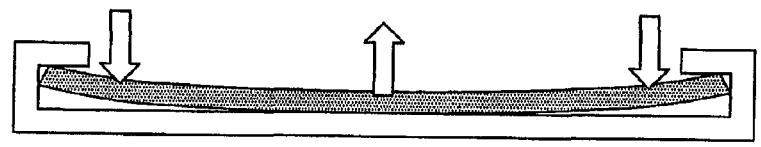
FIG. 7 is a diagram for illustrating a mechanism for the occurrence of display unevenness of a liquid crystal panel incorporated into a bezel.
Figure 7:
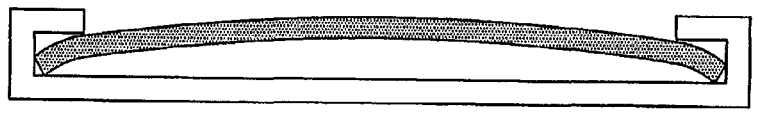

FIG. 6 illustrates the method for measuring the amount of warping. After the bonding of the optical films, the liquid crystal panel is placed on a surface plate in such a manner that the center of the panel comes into contact with the plate (so placed that it is concave to the upper side). The height h from the plate surface to each of the four corners (Nos. 1-4 in FIG. 6) of the panel is measured. The largest height h is determined as the amount of warping. FIG. 6 shows that the side between Nos. 1 and 2 is the short side and the side between Nos. 2 and 4 is the long side.

The appearance evaluation shows the result of the evaluation of display unevenness produced when the liquid crystal panel with the optical films bonded thereto was incorporated into a bezel. The mark "○" indicates the absence of unevenness, and "x" the presence of unevenness. Table 1 shows the results of the evaluation.

TABLE 1

| | Conditions | First piece | Second piece | Third piece | Warping direction | Warping amount [mm] (1) | (2) | (3) | (4) | Maximum | Unevenness (appearance evaluation) |
|---|---|---|---|---|---|---|---|---|---|---|---|
| Example 1 | Film type | MD polarizing film | MD polarizing film | DBEF | Back side/Short side direction | −1.5 | −1.7 | −1.8 | −1.6 | −1.8 | ○ |
| | Bonding side | Back side | Viewer side | Back side | | | | | | | |
| | Bonding direction | Short side direction | Long side direction | Long side direction | | | | | | | |
| | Tension [N/cm] | 1.70 | 1.75 | 1.75 | | | | | | | |

TABLE 1-continued

| | Conditions | First piece | Second piece | Third piece | Warping direction | Warping amount [mm] (1) | (2) | (3) | (4) | Maximum | Unevenness (appearance evaluation) |
|---|---|---|---|---|---|---|---|---|---|---|---|
| Example 2 | Film type | MD polarizing film | DBEF | MD polarizing film | Back side/Short side direction | −1.7 | −1.4 | −1.6 | −1.6 | −1.7 | ○ |
| | Bonding side | Back side | Back side | Viewer side | | | | | | | |
| | Bonding direction | Short side direction | Long side direction | Long side direction | | | | | | | |
| | Tension [N/cm] | 1.70 | 1.75 | 1.75 | | | | | | | |
| Example 3 | Film type | Retardation film | MD polarizing film | MD polarizing film | Back side/Short side direction | −1.0 | −1.2 | −1.3 | −1.2 | −1.3 | ○ |
| | Bonding side | Back side | Viewer side | Back side | | | | | | | |
| | Bonding direction | Short side direction | Long side direction | Short side direction | | | | | | | |
| | Tension [N/cm] | 2.50 | 1.75 | 1.70 | | | | | | | |
| Example 4 | Film type | MD polarizing film | MD polarizing film | DBEF | Back side/Short side direction | −1.1 | −1.0 | −0.9 | −1.1 | −1.1 | ○ |
| | Bonding side | Viewer side | Back side | Back side | | | | | | | |
| | Bonding direction | Long side direction | Short side direction | Long side direction | | | | | | | |
| | Tension [N/cm] | 1.75 | 1.70 | 1.75 | | | | | | | |
| Example 5 | Film type | MD polarizing film | Retardation film | MD polarizing film | Back side/Short side direction | −0.7 | −0.7 | −0.8 | −0.7 | −0.8 | ○ |
| | Bonding side | Viewer side | Back side | Back side | | | | | | | |
| | Bonding direction | Long side direction | Short side direction | Short side direction | | | | | | | |
| | Tension [N/cm] | 1.75 | 2.50 | 1.70 | | | | | | | |
| Comparative Example 1 | Film type | Retardation film | MD polarizing film | MD polarizing film | Viewer side/Long side direction | 2.2 | 2.4 | 2.5 | 2.4 | 2.5 | x |
| | Bonding side | Viewer side | Back side | Viewer side | | | | | | | |
| | Bonding direction | Long side direction | Short side direction | Long side direction | | | | | | | |
| | Tension [N/cm] | 2.50 | 1.70 | 1.75 | | | | | | | |
| Comparative Example 2 | Film type | MD polarizing film | Retardation film | MD polarizing film | Viewer side/Long side direction | 2.2 | 2.4 | 2.4 | 2.4 | 2.4 | x |
| | Bonding side | Back side | Viewer side | Viewer side | | | | | | | |
| | Bonding direction | Short side direction | Long side direction | Long side direction | | | | | | | |
| | Tension [N/cm] | 1.70 | 2.50 | 1.75 | | | | | | | |

In Table 1, the term "back side" with respect to the warping direction means that the panel is warped concave with its back side facing upward, and the term "viewer side" with respect to the warping direction means that the panel is warped concave with its viewer side facing upward. The term "short side" with respect to the warping direction means that the liquid crystal panel is warped along its short side direction, and the term "long side" with respect to the warping direction means that the liquid crystal panel is warped along its long side direction. The "negative value" of the amount of warping means warping toward the back side, and the "positive value" of the amount of warping means warping toward the viewer side. In each of Examples 1 to 5, the liquid crystal panel was successfully warped toward the back side, and no unevenness occurred. In contrast, in each of Comparative Examples 1 and 2, the liquid crystal panel was warped toward the viewer side, and unevenness occurred.

What is claimed is:

1. A method for manufacturing a liquid crystal display device,
comprising:
carrier film feeding steps comprising feeding long carrier films from continuous rolls, respectively, wherein the continuous rolls comprise rolls of laminates comprising the long carrier films and pressure-sensitive adhesive-carrying optical films each with a specific width placed on the carrier films, respectively;
wherein said method comprises:
a plurality of cutting steps, wherein in each cutting step the pressure-sensitive adhesive-carrying optical film of the continuous roll is cut at predetermined intervals;

a plurality of peeling steps, wherein in each peeling step the carrier film is folded back on the carrier film feed path so that each cut optical film is peeled off of said carrier film; and then a plurality of optical film-bonding steps, wherein in each bonding step the peeled off or being peeled off cut optical film is bonded to either the viewer side of a liquid crystal panel or a back side of said liquid crystal panel;

the plurality of cutting steps, the plurality of peeling steps and the plurality of optical-film bonding steps are repeated so that the number of cut optical films bonded to the back side of said liquid crystal panel is greater than the number of cut optical films bonded to the viewer side of said liquid crystal panel.

2. The method according to claim 1, wherein a first cut optical film is bonded to the back side of said liquid crystal panel prior to subsequent cut optical film being bonded to the viewer side of said liquid crystal panel.

3. The method according to claim 2, wherein at least one cut optical film bonded to the back side of the liquid crystal panel is a reflective polarizing film with a multilayer structure.

4. The method according to claim 1 or 2, wherein in the plurality of optical film-bonding steps, the cut optical films bonded to the back side of the liquid crystal panel is in the same bonding direction as the cut optical films bonded to the viewer side of the liquid crystal panel.

5. The method according to claim 4, wherein at least one cut optical film bonded to the back side of the liquid crystal panel is a reflective polarizing film with a multilayer structure.

6. The method according to claim 1, wherein one of the cut optical film bonded to the back side of the liquid crystal panel is a reflective polarizing film with a multilayer structure.

7. A method according to claim 1, wherein a tension on the optical film during the bonding of the optical film to the liquid crystal panel is 0.5 to 7.5 [N/cm];

a storage modulus of the pressure-sensitive adhesive is $1.0 \times 10^4$ to $5.0 \times 10^4$ [GPa]; and an elastic modulus of the optical film is 0.5 to 10.0 [Gpa].

8. A method for manufacturing a liquid crystal display device, comprising:

carrier film feeding steps comprising feeding long carrier films from continuous rolls, respectively, wherein the continuous rolls comprise rolls of laminates comprising the long carrier films and scored at predetermined intervals pressure-sensitive adhesive-carrying optical films each with a specific width placed on the carrier films, respectively;

wherein said method comprises:

a plurality of peeling steps, wherein in each peeling step the carrier film is folded back on the carrier film feed path so that each portion of optical film is peeled off of said carrier film; and then a plurality of optical film-bonding steps, wherein in each bonding step the peeled off or being peeled off portion of optical film is bonded to either the viewer side of a liquid crystal panel or a back side of said liquid crystal panel;

the plurality of peeling steps and the plurality of optical-film bonding steps are repeated so that the number of optical films bonded to the back side of said liquid crystal panel is greater than the number of optical films bonded to the viewer side of said liquid crystal panel.

9. The method according to claim 8, wherein a first cut optical film is bonded to the back side of said liquid crystal panel prior to subsequent cut optical film being bonded to the viewer side of said liquid crystal panel.

10. The method according to claim 8 or 9, wherein in the plurality of optical film-bonding steps, the cut optical films bonded to the back side of the liquid crystal panel is in the same bonding direction as the cut optical films bonded to the viewer side of the liquid crystal panel.

11. The method according to claim 8, wherein one of the cut optical film bonded to the back side of the liquid crystal panel is a reflective polarizing film with a multilayer structure.

* * * * *